United States Patent
Yamamoto et al.

(10) Patent No.: US 10,033,054 B2
(45) Date of Patent: Jul. 24, 2018

(54) FUEL CELL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 138 days.

(21) Appl. No.: 14/933,143

(22) Filed: Nov. 5, 2015

(65) Prior Publication Data
US 2016/0133960 A1 May 12, 2016

(30) Foreign Application Priority Data
Nov. 11, 2014 (JP) .................................. 2014-229033

(51) Int. Cl.
*H01M 8/04302* (2016.01)
*H01M 8/04089* (2016.01)
(Continued)

(52) U.S. Cl.
CPC ... *H01M 8/04097* (2013.01); *H01M 8/04302* (2016.02); *H01M 8/04373* (2013.01); *H01M 8/04776* (2013.01); *H01M 8/04947* (2013.01)

(58) Field of Classification Search
CPC .............................................. H01M 8/04097
See application file for complete search history.

(56) References Cited

U.S. PATENT DOCUMENTS

2002/0031453 A1* 3/2002 Ogino ................. B01D 53/885
422/168
2009/0023020 A1* 1/2009 Hamada ............ H01M 8/04097
429/432
(Continued)

FOREIGN PATENT DOCUMENTS

CN 101390237 A 3/2009
EP 2075867 A2 7/2009
(Continued)

OTHER PUBLICATIONS

Wayback.*
(Continued)

*Primary Examiner* — Sarah A. Slifka
*Assistant Examiner* — Brian R Ohara
(74) *Attorney, Agent, or Firm* — Hunton Andrews Kurth LLP

(57) ABSTRACT

A fuel cell system includes: a fuel cell that includes a membrane electrode assembly clipping an electrolyte membrane with an anode and a cathode; a fuel gas supplier that supplies an anode gas to the anode via an anode gas supply passage in accordance with a power generation request for the fuel cell; a circulation pump that circulates an exhaust gas discharged from the anode to the anode gas supply passage; a judger that judges whether any one of a temperature of the circulation pump and a temperature associated with the temperature of the circulation pump is equal to or less than a prescribed temperature; and a drive controller that drives the circulation pump at a prescribed rotation number when the judger judges that any one of the temperatures is equal to or less than the prescribed temperature, and there is no power generation request for the fuel cell.

5 Claims, 4 Drawing Sheets

(51) Int. Cl.
*H01M 8/04746* (2016.01)
*H01M 8/04828* (2016.01)
*H01M 8/0432* (2016.01)

(56) References Cited

U.S. PATENT DOCUMENTS

| | | |
|---|---|---|
| 2009/0169928 A1 | 7/2009 | Nishimura et al. |
| 2010/0068578 A1 | 3/2010 | Katano |
| 2010/0203409 A1* | 8/2010 | Manabe ............ H01M 8/04268 429/431 |
| 2012/0107706 A1* | 5/2012 | Tanaka .............. H01M 8/04253 429/415 |
| 2013/0157161 A1 | 6/2013 | Matsusue |

FOREIGN PATENT DOCUMENTS

| | | |
|---|---|---|
| JP | 2007-035517 A | 2/2007 |
| JP | 2009-158379 A | 7/2009 |
| JP | 2012-043677 A | 3/2012 |

OTHER PUBLICATIONS

Centrifugal Pump Start-up Procedure, Aug. 26, 2012.*
Habot "What causes centrifugal pump bearing failure" (Year: 2012).*

* cited by examiner

– 1 –
FUEL CELL SYSTEM

CROSS-REFERENCE TO RELATED APPLICATION

This application is based upon and claims the benefit of priority of the prior Japanese Patent Application No. 2014-229033, filed on Nov. 11, 2014, the entire contents of which are incorporated herein by reference.

FIELD OF THE INVENTION

The present invention relates to a fuel cell system.

BACKGROUND

A fuel cell that has a membrane electrode assembly clipping an electrolyte membrane with an anode and a cathode and generates an electric power by an electrochemical reaction of an anode gas supplied to the anode and a cathode gas supplied to the cathode is attracting attention as an energy source. In a fuel cell system with such a fuel cell, it is suggested to circulate an exhaust gas discharged from the anode with a circulation pump and supply it to the anode again, from the viewpoint of improvement of the fuel consumption (see Japanese Laid-Open Patent Publication No. 2012-43677).

When the temperature of the circulation pump circulating the exhaust gas discharged from the anode is low in starting up the fuel cell system and during the driving of the fuel cell system, a condensed water is likely to occur in the circulation pump by a temperature difference between the circulation pump and the exhaust gas. When the circulation pump is driven in a state where the condensed water occurs in the circulation pump, the noise vibration (NV) may get worse.

SUMMARY OF THE INVENTION

It is an object of the present invention to provide a fuel cell system that can suppress the noise vibration.

According to an aspect of the present invention, there is provided a fuel cell system including: a fuel cell that includes a membrane electrode assembly clipping an electrolyte membrane with an anode and a cathode; a fuel gas supplier that supplies an anode gas to the anode via an anode gas supply passage in accordance with a power generation request for the fuel cell; a circulation pump that circulates an exhaust gas discharged from the anode to the anode gas supply passage; a judger that judges whether any one of a temperature of the circulation pump and a temperature associated with the temperature of the circulation pump is equal to or less than a prescribed temperature; and a drive controller that drives the circulation pump at a prescribed rotation number when the judger judges that any one of the temperature of the circulation pump and the temperature associated with the temperature of the circulation pump is equal to or less than the prescribed temperature, and there is no power generation request for the fuel cell.

In the above-mentioned configuration, the drive controller may drive the circulation pump at the prescribed rotation number when there is no power generation request for the fuel cell until a total driving time of the circulation pump at the prescribed rotation number exceeds a prescribed driving time.

In the above-mentioned configuration, when any one of the temperature of the circulation pump and the temperature associated with the temperature of the circulation pump is low at the time of judgment by the judger, the prescribed driving time may be long, compared with a case where any one of the temperature of the circulation pump and the temperature associated with the temperature of the circulation pump is high at the time of judgment by the judger.

In the above-mentioned configuration, the judger may judge whether any one of the temperature of the circulation pump and the temperature associated with the temperature of the circulation pump is equal to or less than the prescribed temperature at the time of startup of the fuel cell system.

DETAILED DESCRIPTION

An embodiment according to the present invention will be described with reference to the accompanying drawings.

First Embodiment

Figure 1:
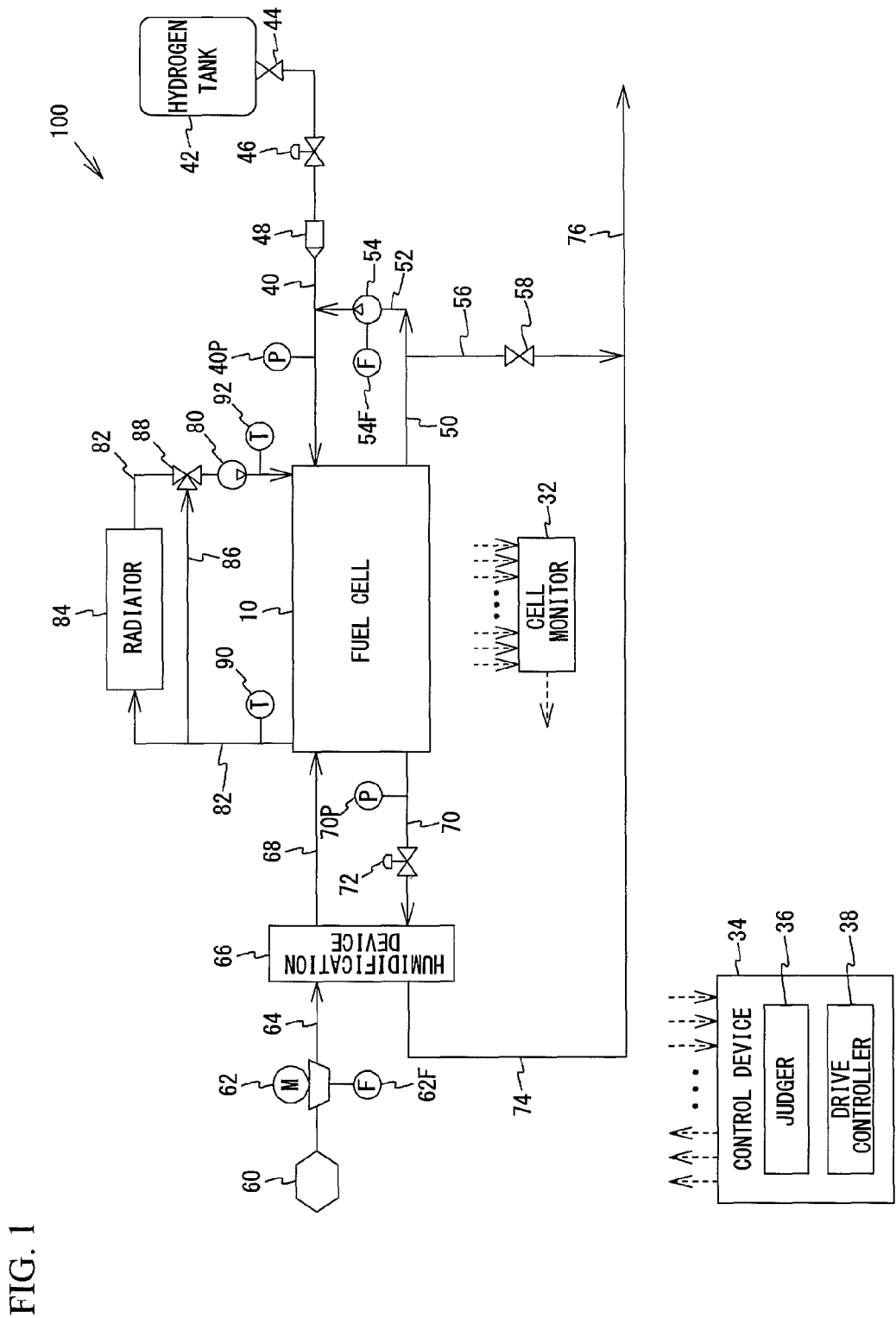
FIG. 1 is a diagram illustrating a schematic configuration of a fuel cell system according to a first embodiment.

FIG. 1 is a diagram illustrating a schematic configuration of a fuel cell system 100 according to a first embodiment. The fuel cell system 100 is mounted on a fuel cell powered vehicle or an electric vehicle as a system to supply a driving power supply. In the fuel cell system 100, a fuel cell 10 is a laminated body that laminates a plurality of fuel battery cells each of which generates an electric power by an electrochemical reaction of a fuel gas (an anode gas, e.g., hydrogen) and an oxidizer gas (a cathode gas, e.g., oxygen).

Figure 2:
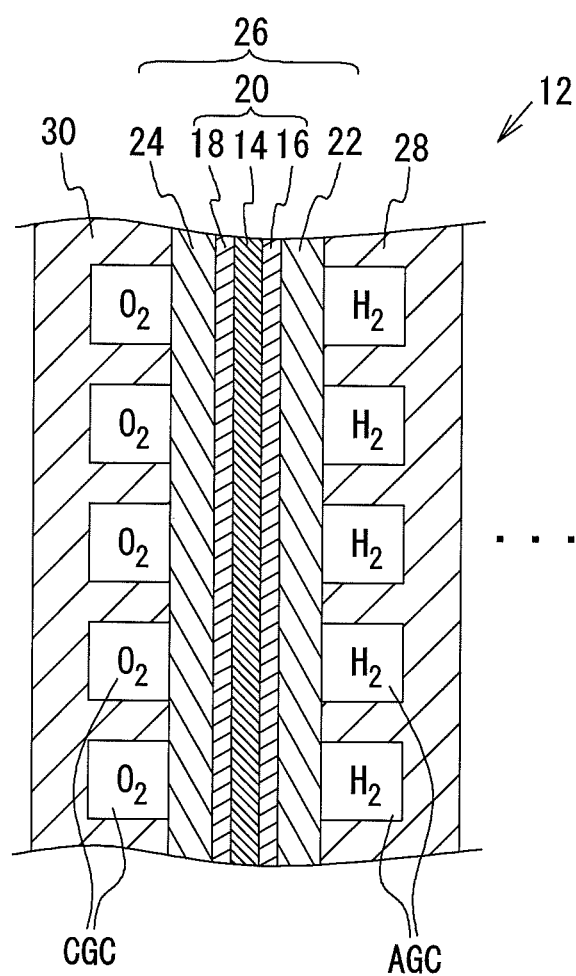
FIG. 2 is a diagram illustrating a schematic configuration of a fuel battery cell.

Here, a description will be given of the fuel battery cell. FIG. 2 is a diagram illustrating a schematic configuration of the fuel battery cell. A fuel battery cell 12 includes a membrane electrode assembly 20 in which an anode 16 and a cathode 18 which are catalyst electrode layers are formed on both sides of an electrolyte membrane 14. The fuel battery cell 12 includes: a power generation body 26 that arranges a pair of gas diffusion layers (an anode gas diffusion layer 22 and a cathode gas diffusion layer 24) on both sides of the membrane electrode assembly 20, respectively; and a pair of separators (an anode side separator 28 and a cathode side separator 30) clipping the power generation body 26.

The electrolyte membrane 14 is a solid polymeric film made of a fluorine-based resin material or a hydrocarbon-based resin material, and has good proton conductivity in a wet state. Each of the anode 16 and the cathode 18 includes: carbon particles (catalyst carrier) which carries a catalytic metal (e.g., platinum) which advances the electrochemical reaction; and a polymer electrolyte (e.g., a fluorine resin) having proton conductivity, for example. Each of the anode gas diffusion layer 22 and the cathode gas diffusion layer 24 is composed of a material having gas permeability and electronic conductivity. For example, each of the anode gas diffusion layer 22 and the cathode gas diffusion layer 24 is made of a porous carbon material such as a carbon cloth or a carbon paper. Each of the anode gas diffusion layer 22 and the cathode gas diffusion layer 24 may be provided with a water repellent layer on a surface contacting the membrane electrode assembly 20.

Each of the anode side separator 28 and the cathode side separator 30 is composed of a material having gas permeability and electronic conductivity. For example, each of the anode side separator 28 and the cathode side separator 30 is made of a carbon member such as a dense carbon which does not make a gas permeate by compressing a carbon, or a metal member such as a press-molded stainless steel. Each of the anode side separator 28 and the cathode side separator 30 includes concavities and convexities for forming channels through which a gas and a liquid flow, on the surface. Anode gas channels AGC through which the gas and the liquid can flow are formed between the anode side separator 28 and the anode gas diffusion layer 22. Cathode gas channels CGC through which the gas and the liquid can flow are formed between the cathode side separator 30 and the cathode gas diffusion layer 24.

As illustrated in FIG. 1, hydrogen as a fuel gas is supplied to the anode of the fuel cell 10 from a hydrogen tank 42 which stores high pressure hydrogen via an anode gas supply passage 40. The anode gas supply passage 40 is a pipe, for example. Here, for example, used instead of the hydrogen tank 42 may be a hydrogen generation device which generates hydrogen by a reforming reaction using alcohol, hydrocarbon or aldehyde as a raw material.

A pressure and a supply amount of the high pressure hydrogen stored in the hydrogen tank 42 are adjusted by a shut valve 44 provided at an outlet of the hydrogen tank 42, and a regulator 46 and an injector 48 disposed on the anode gas supply passage 40. The adjusted high pressure hydrogen is supplied to the anode of the fuel cell 10. A pressure sensor 40P for detecting a pressure inside the anode gas supply passage 40 is disposed on the anode gas supply passage 40. The injector 48 corresponds to a fuel gas supplier.

An exhaust gas from the anode (hereinafter referred to as "an anode off-gas") is discharged to an anode gas exhaust passage 50. The anode gas exhaust passage 50 is a pipe, for example. The anode off-gas that includes hydrogen not consumed by the power generation and is discharged to the anode gas exhaust passage 50 can be recirculated to the anode gas supply passage 40 via a circulation passage 52. The circulation passage 52 is a pipe, for example. Here, a pressure of the anode off-gas is in a relatively low state as a result of the consumption of the hydrogen by the power generation in the fuel cell 10. For this reason, a circulation pump 54 for pressurizing the anode off-gas at the time of the recirculation of the anode off-gas is disposed on the circulation passage 52. A flow rate sensor 54F for detecting a circulation flow rate of the anode off-gas is provided on the circulation pump 54.

A passage 56 (e.g. a pipe) is connected to the anode gas exhaust passage 50. A purge valve 58 is disposed on the passage 56. While the purge valve 58 is closed, the anode off-gas including the hydrogen not consumed by the power generation is supplied again to the fuel cell 10 via the circulation passage 52. Thereby, it is possible to use the hydrogen efficiently.

During the recirculation of the anode off-gas, the hydrogen is consumed by the power generation. On the other hand, impurities (e.g. nitrogen which is transmitted from a cathode side to an anode side via the electrolyte membrane) other than the hydrogen remain without being consumed. For this reason, a density of the impurities in the anode off-gas gradually increases. At this time, when the purge valve 58 is opened, the anode off-gas is discharged to the outside of the fuel cell system 100 via the passage 56 and a passage 76 along with a cathode off-gas described later. Thereby, the density of the impurities in the anode off-gas can be reduced.

A compressed air is supplied to the cathode of the fuel cell 10 as an oxidizer gas containing oxygen. The air is sucked from an air cleaner 60, is compressed by an air compressor 62, and is introduced into a humidification device 66 via a passage 64 (e.g., a pipe). The compressed air introduced into the humidification device 66 is humidified with the humidification device 66, and then is supplied to the cathode of the fuel cell 10 from a cathode gas supply passage 68. A flow rate sensor 62F for detecting a supply flow rate of the air is provided on the air compressor 62. Here, the humidification device 66 does not have to be installed.

An exhaust gas from the cathode (hereinafter referred to as "the cathode off-gas") is discharged to a cathode gas exhaust passage 70 (e.g. a pipe). Disposed on the cathode gas exhaust passage 70 are a pressure sensor 70P for detecting a back pressure of the cathode off-gas and a pressure adjustment valve 72 for adjusting the back pressure of the cathode off-gas. The cathode off-gas with the high humidity discharged from the fuel cell 10 to the cathode gas exhaust passage 70 is introduced into the humidification device 66, is used by the humidification of the air; and then is discharged to the outside of the fuel cell system 100 via a passage 74 and the passage 76 (e.g. pipes).

The fuel cell 10 generates heat by the above-mentioned electrochemical reaction. For this reason, in order to make the temperature of the fuel cell 10 into a temperature suitable for the power generation, a coolant water is supplied to the fuel cell 10. The coolant water flows through a passage 82 (e.g. a pipe) for coolant water by a water pump 80, is cooled by a radiator 84, and is supplied to the fuel cell 10. A bypass passage 86 (e.g. a pipe) for circulating the coolant water without passing through the radiator 84 is connected to the passage 82. A rotary valve 88 is disposed at one of connection parts between the passage 82 and the bypass passage 86. By switching the rotary valve 88, the coolant water can be circulated via the passage 82 and the bypass passage 86 without passing through the radiator 84. A temperature sensor 90 for detecting the temperature of the coolant water discharged from the fuel cell 10 is provided on the passage 82 near a discharge part of the fuel cell 10 from which the coolant water is discharged. A temperature sensor 92 for detecting the temperature of the coolant water to be supplied to the fuel cell 10 is provided on the passage 82 near a supply part of the fuel cell 10 to which the coolant water is supplied.

Moreover, a cell monitor 32 is connected to the fuel cell 10. The cell monitor 32 detects a cell voltage, a current and an impedance about each fuel battery cell in the fuel cell 10.

The driving of the fuel cell system 100 is controlled by a control device 34. The control device 34 includes a microcomputer having a CPU (Central Processing Unit), a RAM (Random Access Memory), a ROM (Read Only Memory) and so on. The control device 34 controls the driving of the system in accordance with a program stored into the ROM. The ROM stores various maps and threshold values to be used for the control of the fuel cell system 100 other than the above-mentioned program. Based on the request outputs for the fuel cell 10 and the outputs of various sensors, the control device 34 drives various valves, the circulation pump 54, the water pump 80, the air compressor 62 and so on, and controls the driving of the system including a process suppressing the generation of a condensed water described later. The control device 34 functions as a judger 36 and a drive controller 38 in the process for suppressing the generation of the condensed water.

Figure 3:
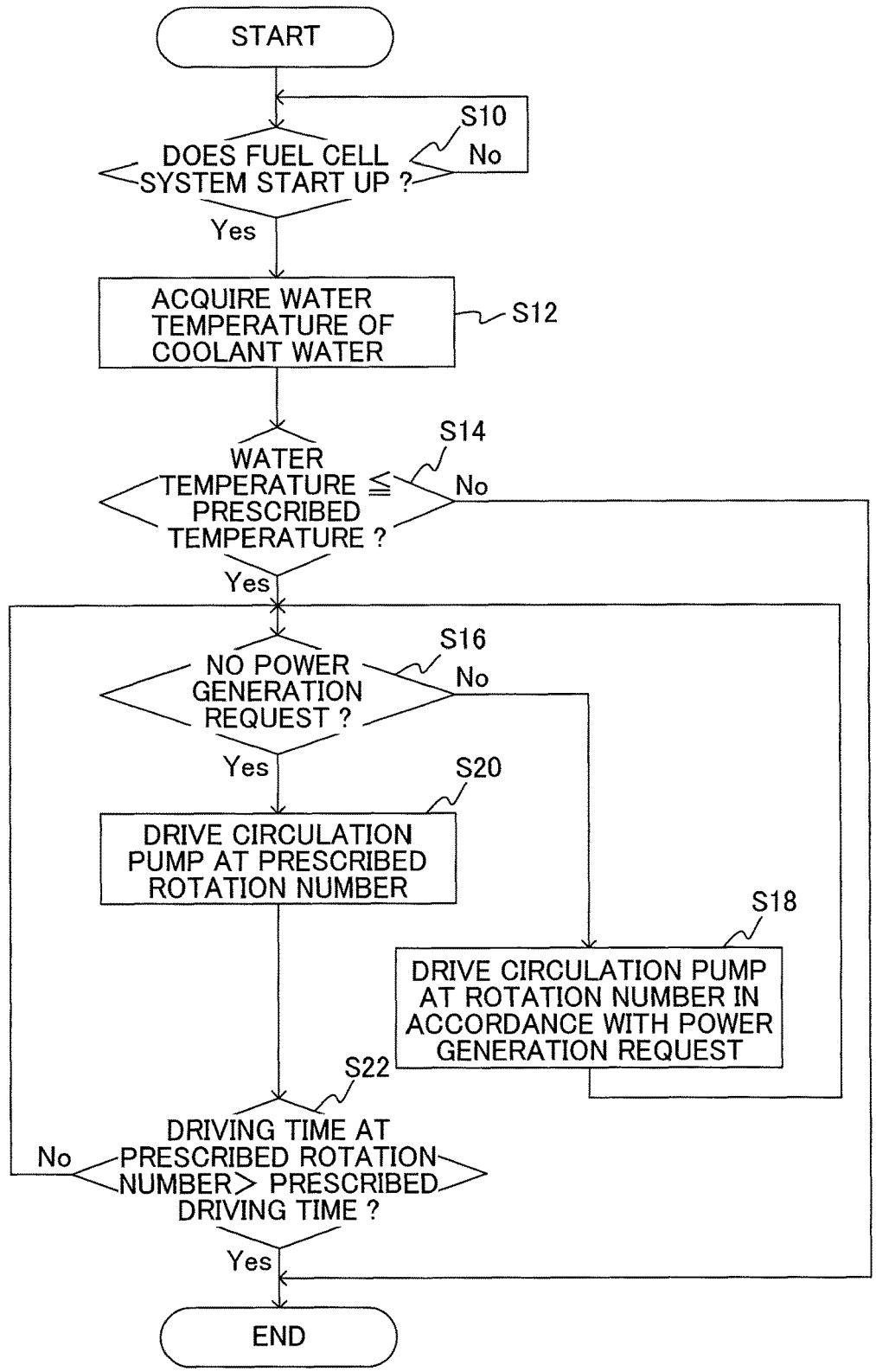
FIG. 3 is a flowchart illustrating an example of a process for suppressing the generation of a condensed water.

FIG. 3 is a flowchart illustrating an example of the process for suppressing the generation of the condensed water. As illustrated in FIG. 3, the control device 34 waits until the fuel cell system 100 starts up (step S10). When the fuel cell system 100 is started up, the control device 34 acquires a water temperature of the coolant water (step S12). The water temperature of the coolant water at the time of startup of the fuel cell system 100 is associated with the temperature of the circulation pump 54. For this reason, the control device 34 can indirectly acquire the temperature of the circulation pump 54 by acquiring the water temperature of the coolant water at the time of startup of the fuel cell system 100. Here, the water temperature of the coolant water may be detected by either of the temperature sensors 90 and 92.

Next, after the control device 34 acquires the water temperature of the coolant water, the control device 34 judges whether the water temperature is equal to or less than a prescribed temperature stored beforehand in the ROM (step S14). Here, since the water temperature of the coolant water at the time of startup of the fuel cell system 100 is associated with the temperature of the circulation pump 54 as described above, judging the water temperature of the coolant water at the time of startup of the fuel cell system 100 is the same as judging the temperature of the circulation pump 54. The reason for judging whether the water temperature of the coolant water is equal to or less than the prescribed temperature is that the condensed water is likely to be generated in the circulation pump 54 when the water temperature is equal to or less than the prescribed temperature. That is, when the driving of the fuel cell system 100 is started under a condition that the water temperature of the coolant water is equal to or less than the prescribed temperature, the temperature of the fuel cell 10 rises more quickly than the temperature of the circulation pump 54 due to the power generation. Since the temperature of the fuel cell 10 is almost the same as the temperature of the anode off-gas discharged from the fuel cell 10, a difference between the temperature of the anode off-gas and the temperature of the circulation pump 54 becomes large. Thereby, the condensed water is likely to be generated in the circulation pump 54. Thus, the prescribed temperature is a temperature indicating a threshold value of whether the condensed water is likely to be generated in the circulation pump 54, and it is 20 degrees, for example.

When the water temperature of the coolant water is more than the prescribed temperature (NO in step S14), the condensed water is hard to be generated in the circulation pump 54, and therefore the control device 34 finishes the process for suppressing the generation of the condensed water.

When the water temperature of the coolant water is equal to or less than the prescribed temperature (YES in step S14), the control device 34 judges whether there is not a power generation request for the fuel cell 10 (step S16). When there is the power generation request for the fuel cell 10 (NO in step S16), the control device 34 drives the circulation pump 54 at a rotation number (i.e., a rotation speed) in accordance with the power generation request (step S18).

On the other hand, when there is not the power generation request for the fuel cell 10 (YES in step S16), the control device 34 drives the circulation pump 54 at a prescribed rotation number (i.e., a prescribed rotation speed) (e.g. a constant rotation number of 1800 rpm) decided in consideration of a warm-up effect and a drive sound (step S20). The circulation pump 54 is driven at the prescribed rotation number (hereinafter, referred to as "a warm-up rotation number") decided in consideration of the warm-up effect and the drive sound, so that the drive sound of the circulation pump 54 can be suppressed and the warm-up of the circulation pump 54 can be accelerated. As a result, the difference between the temperature of the anode off-gas and the temperature of the circulation pump 54 can be reduced immediately.

Figure 4:
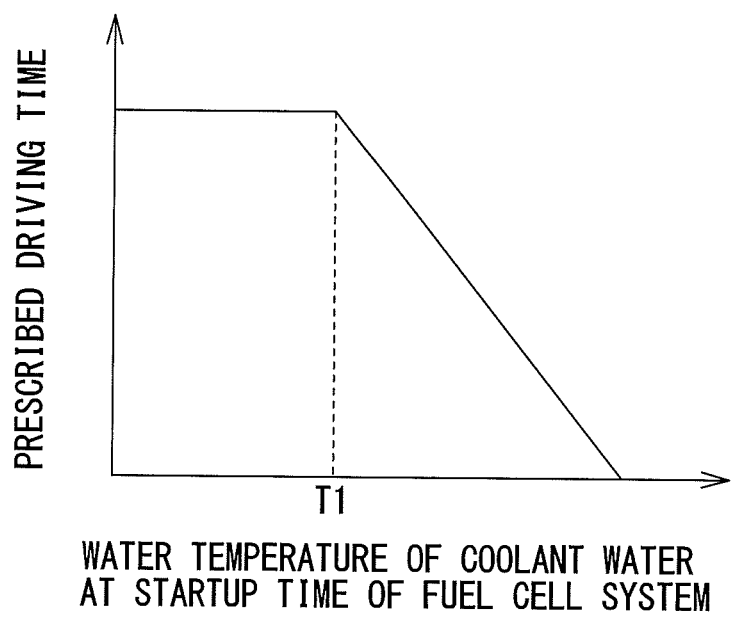
FIG. 4 is a diagram explaining a prescribed driving time of a circulation pump at the prescribed rotation number in warm-up operation.

Next, the control device 34 judges whether a total driving time of the circulation pump 54 at the warm-up rotation number exceeds the prescribed driving time (step S22). Here, a description will be given of the total driving time. FIG. 4 is a diagram explaining the prescribed driving time of the circulation pump 54 at the warm-up rotation number. A horizontal axis of FIG. 4 is the water temperature of the coolant water at the time of startup of the fuel cell system 100, and a vertical axis is the prescribed driving time. Here, a map of FIG. 4 is stored in the ROM of the control device 34.

When the water temperature of the coolant water at the time of startup of the fuel cell system 100 is low, the prescribed driving time is set so as to become long, compared with a case where the water temperature of the coolant water is high, as illustrate in FIG. 4. Thus, the prescribed driving time is changed depending on the water temperature of the coolant water at the time of startup of the fuel cell system 100 because it is necessary to satisfy all of the following requests. A first request is that the circulation pump 54 is driven at the warm-up rotation number until the difference between the temperature of the circulation pump 54 and the temperature of the anode off-gas becomes small and the condensed water is hard to be generated in the circulation pump 54. A second request is that the driving of the circulation pump 54 at the warm-up rotation number is made as short as possible because the driving of the circulation pump 54 at a relatively high warm-up rotation number increases the drive sound and a power consumption.

Therefore, in step S22, the control device decides the prescribed driving time based on the water temperature of the coolant water at the time of startup of the fuel cell system 100 acquired in step S12, and the map of the prescribed driving time and the water temperature of the coolant water at the time of startup of the fuel cell system 100 of FIG. 4, and judges whether the total driving time of the circulation pump 54 at the warm-up rotation number exceeds the prescribed driving time.

When the water temperature of the coolant water at the time of startup of the fuel cell system 100 is equal to or less than a prescribed temperature T1, the prescribed driving time may be made constant, as illustrated in FIG. 4. The reason why the prescribed driving time may be made constant is as follows. The temperature of the circulation pump 54 raised by driving the circulation pump 54 at the warm-up rotation number has a limitation. Therefore, even if the circulation pump 54 is driven at the warm-up rotation number beyond the constant driving time, an effect of the temperature rise of the circulation pump 54 is small. Moreover, it is preferable to shorten the driving time of the circulation pump 54 from a point of the drive sound and the power consumption.

When the total driving time of the circulation pump 54 at the warm-up rotation number does not exceed the prescribed driving time (NO in step S22), the control device 34 returns to step S16. When the total driving time of the circulation pump 54 at the warm-up rotation number exceeds the prescribed driving time (YES in step S22), the control device 34 finishes the process for suppressing the generation of the condensed water.

As described above, according to the first embodiment, the control device 34 judges whether the water temperature of the coolant water associated with the temperature of the circulation pump 54 is equal to or less than the prescribed temperature, and drives the circulation pump 54 at the warm-up rotation number when the water temperature of the coolant water is equal to or less than the prescribed temperature and there is no power generation request for the fuel cell 10. Thereby, the temperature rise of the circulation pump 54 can be accelerated, and it is possible to suppress the generation of the condensed water in the circulation pump 54 by the difference between the temperature of the circulation pump 54 and the temperature of the anode off-gas. Accordingly, the noise vibration of the circulation pump 54 due to the condensed water can be suppressed.

Moreover, according to the first embodiment, when there is no power generation request for the fuel cell 10 until the total driving time of the circulation pump 54 at the warm-up rotation number exceeds the prescribed driving time, the control device 34 drives the circulation pump 54 at the warm-up rotation number. This makes it possible to raise the temperature of the circulation pump 54 to the temperature in which the generation of the condensed water is suppressed. Moreover, when the water temperature of the coolant water at the time of startup of the fuel cell system 100 is low, the prescribed driving time is set so as to become long as illustrated in FIG. 4, compared with a case where the water temperature of the coolant water is high. This makes it possible to suppress the increase of the drive sound and the power consumption of the circulation pump 54, and to raise the temperature of the circulation pump 54 to the temperature in which the generation of the condensed water is suppressed.

Moreover, according to the first embodiment, the control device 34 judges whether to perform warm-up operation for the circulation pump 54, based on whether the water temperature of the coolant water at the time of startup of the fuel cell system 100 is equal to or less than the prescribed temperature. It is assumed that, at the time of startup of the fuel cell system 100, the temperature of the circulation pump 54 is low and the condensed water is likely to be generated in the circulation pump 54. However, according to the first embodiment, in such a case, the generation of the condensed water in the circulation pump 54 is suppressed.

In the first embodiment, the control device 34 judges whether to perform the warm-up operation for the circulation pump 54, based on the water temperature of the coolant water. However, the control device 34 may judge whether to perform the warm-up operation for the circulation pump 54, based on a temperature associated with the temperature of the circulation pump 54 other than the water temperature of the coolant water. In addition, a temperature sensor for detecting the temperature of the circulation pump 54 may be provided on the circulation pump 54, and the control device 34 may judge whether to perform the warm-up operation for the circulation pump 54, based on the temperature of the circulation pump 54 detected by the temperature sensor.

In the first embodiment, it is explained that the warm-up rotation number of the circulation pump 54 is 1800 rpm, as an example. However, the warm-up rotation number is not limited to this, and may be another rotation number decided in consideration of the warm-up effect and the drive sound. When the rotation number of the circulation pump 54 is more than 2000 rpm, the drive sound of the circulation pump 54 may echo with the surroundings. On the other hand, when the rotation number of the circulation pump 54 is less than 1800 rpm, the effect of warming up the circulation pump 54 reduces. Here, it is preferable that the warm-up rotation number is constant. This is because the drive sound fluctuates when the warm-up rotation number fluctuates, which might make a user uncomfortable.

In the first embodiment, the control device 34 judges whether to perform the warm-up operation for the circulation pump 54, based on the water temperature of the coolant water at the time of startup of the fuel cell system 100. However, the control device 34 may judge whether to perform the warm-up operation for the circulation pump 54, based on the water temperature of the coolant water during the driving of the fuel cell system 100 after the startup of the fuel cell system 100. Moreover, in the first embodiment, it is explained that the fuel gas supplier is the injector 48, as an example. However, the fuel gas supplier may be an element other than the injector 48.

While the exemplary embodiments of the present invention have been illustrated in detail, the present invention is not limited to the above-mentioned embodiments, and other embodiments, variations and modifications may be made without departing from the scope of the present invention.

What is claimed is:

1. A fuel cell system comprising:
   a fuel cell that includes a membrane electrode assembly clipping an electrolyte membrane with an anode and a cathode;
   a fuel gas supplier that supplies an anode gas to the anode via an anode gas supply passage in accordance with a power generation request for the fuel cell;
   a circulation pump that circulates an exhaust gas discharged from the anode to the anode gas supply passage;
   a judger programmed to judge whether any one of a temperature of the circulation pump and a temperature associated with the temperature of the circulation pump is equal to or less than a prescribed temperature; and
   a drive controller programmed to drive the circulation pump at a rotation number in accordance with the power generation request when the judger judges that any one of the temperature of the circulation pump and the temperature associated with the temperature of the circulation pump is equal to or less than the prescribed temperature and there is the power generation request for the fuel cell, and drive the circulation pump at a prescribed rotation number, different than the rotation number in accordance with the power generation request, after driving the circulation pump at the rotation number in accordance with the power generation request when the judger judges that any one of the temperature of the circulation pump and the temperature associated with the temperature of the circulation pump is equal to or less than the prescribed temperature and there is no power generation request for the fuel cell.

2. The fuel cell system as claimed in claim 1, wherein the drive controller drives the circulation pump at the prescribed rotation number when there is no power generation request for the fuel cell until a total driving time of the circulation pump at the prescribed rotation number exceeds a prescribed driving time.

3. The fuel cell system as claimed in claim 2, wherein when any one of the temperature of the circulation pump and the temperature associated with the temperature of the circulation pump is low at the time of judgment by the judger, the prescribed driving time is long, compared with a case where any one of the temperature of the circulation pump and the temperature associated with the temperature of the circulation pump is high at the time of judgment by the judger.

4. The fuel cell system as claimed in claim 1, wherein the judger judges whether any one of the temperature of the circulation pump and the temperature associated with the temperature of the circulation pump is equal to or less than the prescribed temperature at the time of startup of the fuel cell system.

5. A fuel cell system comprising:
   a fuel cell that includes a membrane electrode assembly clipping an electrolyte membrane with an anode and a cathode;
   a fuel gas supplier that supplies an anode gas to the anode via an anode gas supply passage in accordance with a power generation request for the fuel cell;
   a circulation pump that circulates an exhaust gas discharged from the anode to the anode gas supply passage;
   a judger programmed to judge whether any one of a temperature of the circulation pump and a temperature associated with the temperature of the circulation pump is equal to or less than a prescribed temperature, said prescribed temperature being a temperature at which condensed water is generated; and
   a drive controller programmed to drive the circulation pump at a prescribed rotation number when the judger judges that any one of the temperature of the circulation pump and the temperature associated with the temperature of the circulation pump is equal to or less than the prescribed temperature and there is no power generation request for the fuel cell, and drive the circulation pump at a rotation number in accordance with the power generation request, different from the prescribed rotation number, when the judger judges that any one of the temperature of the circulation pump and the temperature associated with the temperature of the circulation pump is equal to or less than the prescribed temperature and there is the power generation request for the fuel cell.

\* \* \* \* \*